United States Patent [19]

Shamshoum et al.

[11] Patent Number: 6,156,854

[45] Date of Patent: *Dec. 5, 2000

[54] METHOD OF OLEFIN POLYMERIZATION UTILIZING HYDROGEN PULSING, PRODUCTS MADE THEREFROM, AND METHOD OF HYDROGENATION

[75] Inventors: Edwar S. Shamshoum, Houston; David J. Rauscher, Angleton, both of Tex.

[73] Assignee: Fina Technology, Inc., Houston, Tex.

[ * ] Notice: This patent is subject to a terminal disclaimer.

[21] Appl. No.: 09/003,222

[22] Filed: Jan. 6, 1998

Related U.S. Application Data

[63] Continuation of application No. 08/797,462, Feb. 6, 1997, Pat. No. 5,739,220.

[51] Int. Cl.⁷ .................................................. C08J 10/06
[52] U.S. Cl. .............................. 526/81; 526/79; 526/160; 526/943; 526/106
[58] Field of Search ............................... 526/79, 81, 160, 526/943

[56] References Cited

U.S. PATENT DOCUMENTS

| | | | |
|---|---|---|---|
| 3,472,829 | 10/1969 | Claybaugh et al. | 260/93.7 |
| 3,922,322 | 11/1975 | Roger et al. | 525/54 |
| 4,659,685 | 4/1987 | Coleman, III et al. | 502/113 |
| 4,939,217 | 7/1990 | Stricklen | 526/114 |
| 5,739,220 | 4/1998 | Shamshoum et al. | 526/79 |

FOREIGN PATENT DOCUMENTS

| | | |
|---|---|---|
| 0228226 | 10/1988 | European Pat. Off. . |
| 0288226 | 10/1988 | European Pat. Off. . |
| 0768319 | 4/1997 | European Pat. Off. . |
| 0778293 | 6/1997 | European Pat. Off. . |
| 2183245 | 6/1987 | United Kingdom . |

*Primary Examiner*—David W. Wu
*Assistant Examiner*—Tanya Zalukaeva
*Attorney, Agent, or Firm*—Mark Gilbreth; Jim D. Wheelington

[57] ABSTRACT

An olefin polymerization process in which at least two introductions of hydrogen are made during the olefin polymerization reaction. Suitable catalysts include metallocenes of the general formula $(Cp)_m TiX_n$, wherein Cp is a substituted or unsubstituted cyclopentadienyl ring, X is a halogen, $m=1-2$, $n=2-3$, and wherein $m+n=4$, and conventional Ziegler-Natta catalysts blended with or modified by such metallocenes.

12 Claims, 3 Drawing Sheets

METHOD OF OLEFIN POLYMERIZATION UTILIZING HYDROGEN PULSING, PRODUCTS MADE THEREFROM, AND METHOD OF HYDROGENATION

This application is a Continuation application of U.S. patent application Ser. No. 08/797,462 filed Feb. 6, 1997, issued Apr. 14, 1998 as U.S. Pat. No. 5,739,220.

BACKGROUND OF THE INVENTION

1. Field of the Invention

The present invention relates to a process of polymerization, catalyst therefor, to products made therefrom, and to hydrogenation. In another aspect, the present invention relates to method of olefin polymerization, to a hydrogenation/olefin polymerization catalyst therefor, and to products made therefrom. In even another aspect, the present invention relates to a method of olefin polymerization utilizing hydrogen pulsing, to a hydrogenation/olefin polymerization catalyst therefor, and to broad molecular weight distribution products made therefrom. In still another aspect, the present invention relates to a method of propylene polymerization, to a hydrogenation/olefin polymerization catalyst therefor, and to broad molecular weight distribution polypropylene made therefrom.

2. Description of the Related Art

In the production of polyolefins, it is desirable to have some control over the molecular weight distribution of the produced polyolefin.

U.S. Pat. No. 4,914,253, issued Apr. 3, 1990 to Chang, discloses a process for preparing polyethylene wax having a narrow molecular weight distribution in a gas phase polymerization reactor. The catalyst is derived from the addition of silica gel containing about 6 to 20 weight percent adsorbed water to a trialkylaluminum solution. An alumoxane coated silica gel is formed to which a metallocene is added and formed into a free flowing powder. Chang further teaches that a direct correlation exists between the molecular weight of the polymeric wax obtained and the amount of hydrogen utilized during polymerization. Control of the molecular weight is achieved by varying the amount of hydrogen utilized and the reaction temperature. The catalyst test example discloses that during polymerization, ethylene, hydrogen and nitrogen were continuously fed to the reactor.

U.S. Pat. No. 4,935,474, issued Jun. 19, 1990 to Ewen et al., discloses a process and catalyst for producing polyethylene having a broad molecular weight distribution. The polyethylenes are obtained directly from a single polymerization process using a catalyst system comprising at least two different metallocenes each having different propagation and termination rate constants, and an alumoxane.

U.S. Pat. No. 4,975,403, issued Dec. 4, 1990 to Ewen, discloses a catalyst system for producing polyolefins having a broad molecular weight distribution. The catalyst system includes at least two different chiral, stereo-rigid metallocene catalysts of the formula $R''(C_5(R')_4)_2MeQ_p$ and an aluminum compound.

U.S. Pat. No. 5,124,418, issued Jun. 23, 1992 to Welborn, Jr. discloses a catalyst and process having the capability of producing polymers having a varied range of molecular weight distributions, i.e., from narrow molecular weight distribution to broad molecular weight distribution and/or multi-modal molecular weight distribution. Broad molecular weight polyethylenes can be obtained by employing on one support metallocenes and transition metal components which will have different propagation and termination rate constants for ethylene polymerization. The molecular weight distribution of the polyethylenes can also readily be controlled by varying the molar ratios of the metallocene to transition metal component on the support. Further discloses that conventional polymerization adjuvants such as hydrogen, can be employed to control the molecular weight of the polyethylene produced.

U.S. Pat. No. 5,359,015, issued Oct. 25, 1994 to Jejelowo, and U.S. Pat. No. 5,281,679, issued Jan. 25, 1994 to Jejelowo et al., disclose a metallocene catalyst system and process of producing polyolefins having a controllable broadened molecular weight distribution. The cyclopentadienyl ring comprises as a molecular weight distribution broadening substituent, a hydrocarbon group having from 3 to 20 carbon atoms, with one of the carbon atoms being a 2° or 3° carbon which is covalently bonded to the cyclopentadienyl ring. Control of the molecular weight distribution is provided by varying the types of substituents on the ring. The process may utilize conventional polymerization adjuvants, such as hydrogen.

U.S. Pat. No. 5,382,631, issued Jan. 17, 1995 to Stehling et al., discloses linear ethylene interpolymer blends of interpolymers having narrow molecular weight and composition distributions. Discloses that in slurry polymerization, a suspension of solid, particulate polymer is formed in a liquid polymerization medium to which ethylene and comonomers and often hydrogen along with catalyst are added. Further discloses that in gas-phase polymerization, performed in a stirred or fluidized bed of catalyst and product particles, that thermostated ethylene, comonomer, hydrogen and an inert diluent gas such as nitrogen can be introduced or recirculated so as to maintain the particles within a temperature range.

U.S. Pat. No. 5,420,217, issued May 30, 1995 to Canich, discloses a polyolefin polymerization process using a Group IV B transition metal component and an alumoxane component to polymerize propylene to produce amorphous polypropylene.

However, in spite of these advancements in the prior art, none of these prior art references disclose or suggest polyolefin polymerization utilizing hydrogen pulsing, nor the use of a metallocene catalyst as a hydrogenation component.

Thus, there is still a need for an improved polyolefin polymerization process.

There is another need in the art for improved polyolefin process catalysts.

There is even another need in the art for improved polyolefin products.

These and other needs in the art will become apparent to those of skill in the art upon review of this specification, including its drawings and claims.

SUMMARY OF THE INVENTION

It is an object of the present invention to provide for a polyolefin polymerization process.

It is another object of the present invention to provide for polyolefin polymerization catalysts.

It is even another object of the present invention to provide for polyolefin products.

These and other objects of the present invention will become apparent to those of skill in the art upon review of this specification, including its drawings and claims.

According to one embodiment of the present invention, there is provided a process for the polymerization of olefins.

The process generally includes contacting together olefin monomer in the presence of a catalyst system to form a polymer product. The process further includes making at least two introductions of hydrogen into the reaction zone during the polymerization to control the molecular weight distribution. The hydrogen is introduced to the reaction zone and allowed to substantially deplete in a period of time less than the reaction residence time, before the subsequent introduction of hydrogen. The catalyst system utilized may include an olefin polymerization catalyst and a hydrogenation catalyst. Alternatively, the catalyst system may include a metallocene of the general formula $(Cp)_m TiX_n$, wherein Cp is a substituted or unsubstituted cyclopentadienyl ring, X is a halogen, m=1–2, n=2–3, and wherein m+n=4. The catalyst system may also include a conventional Ziegler-Natta catalyst which is blended with or modified by the metallocene.

According to another embodiment of the present invention, there is provided a process for hydrogenation an unsaturated hydrocarbon. The process generally includes contacting the unsaturated hydrocarbon with hydrogen in the presence of a catalyst comprising metallocene of the general formula $(Cp)_m TiX_n$, wherein Cp is a substituted or unsubstituted cyclopentadienyl ring, X is a halogen, m=1–2, n=2–3, and wherein m+n=4.

DETAILED DESCRIPTION OF THE INVENTION

The olefin polymerization of the present invention is carried out as is generally known in the art, except as explained below.

In the practice of the present invention, the olefin reactants are contacted together in the presence of a catalyst system to polymerize the olefin into a polyolefin. The catalyst system is bifunctional in that it functions both as a polymerization catalyst and as a hydrogenation catalyst. Hydrogen is introduced into the reactor to control molecular weight distribution.

For batch polymerization, at least two introductions (or pulses) of hydrogen are made to the reactor during the polymerization batch reaction. Preferably, at least three, and most preferably, at least four introductions of hydrogen are made to the reactor during polymerization.

For continuous polymerization, the amount of time between introductions of hydrogen must be less than the residence time of the reactants in the reaction zone. Generally at least two, preferably at least three and most preferably at least four introductions of hydrogen is made within a residence time period.

It is generally desired that the polymerization be carried out at either a first hydrogen concentration or a second hydrogen concentration, with limited polymerization at concentrations therebetween. That means, the deletion and addition steps occur rather rapidly.

Figure 2:
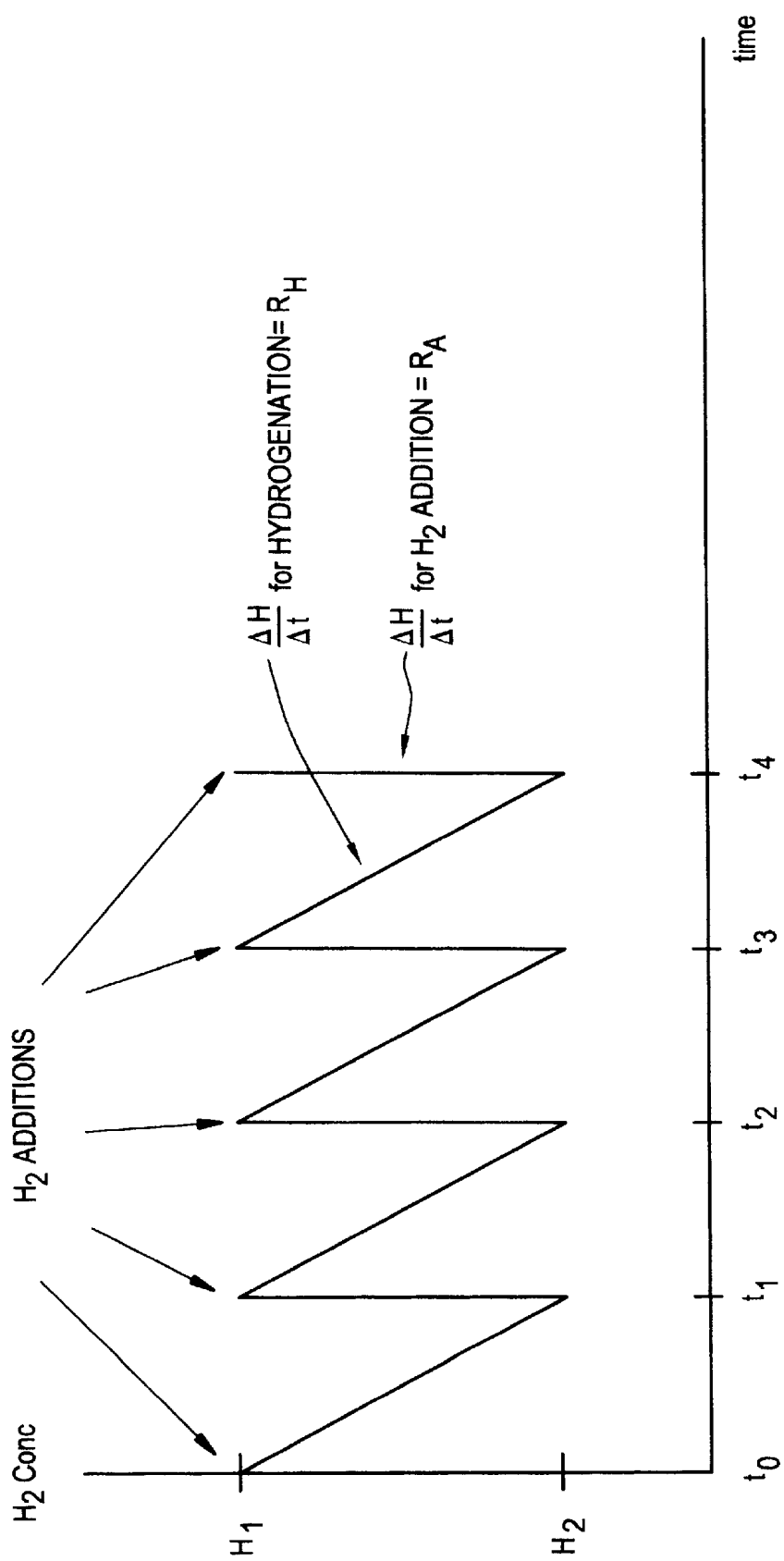
FIG. 2 is a graphical representation of the hydrogen concentration for one embodiment of a polymerization according to the present invention.

Referring now to FIG. 2, there is shown a graphical representation of the reactor concentration of hydrogen as a function of time. The first hydrogen concentration Hi will generally occur at the time of the hydrogen addition, and will decrease at a rate $R_H$ over time to a second hydrogen concentration H2 due to hydrogenation. To minimize polymerization at hydrogen concentrations between H1 and H2, it is generally desired that hydrogenation change the hydrogen concentration rather quickly, that is, the magnitude of $R_H$ be rather large, and that the hydrogen addition occur rather quickly, that is, the magnitude of $R_A$ be rather large.

Figure 3:
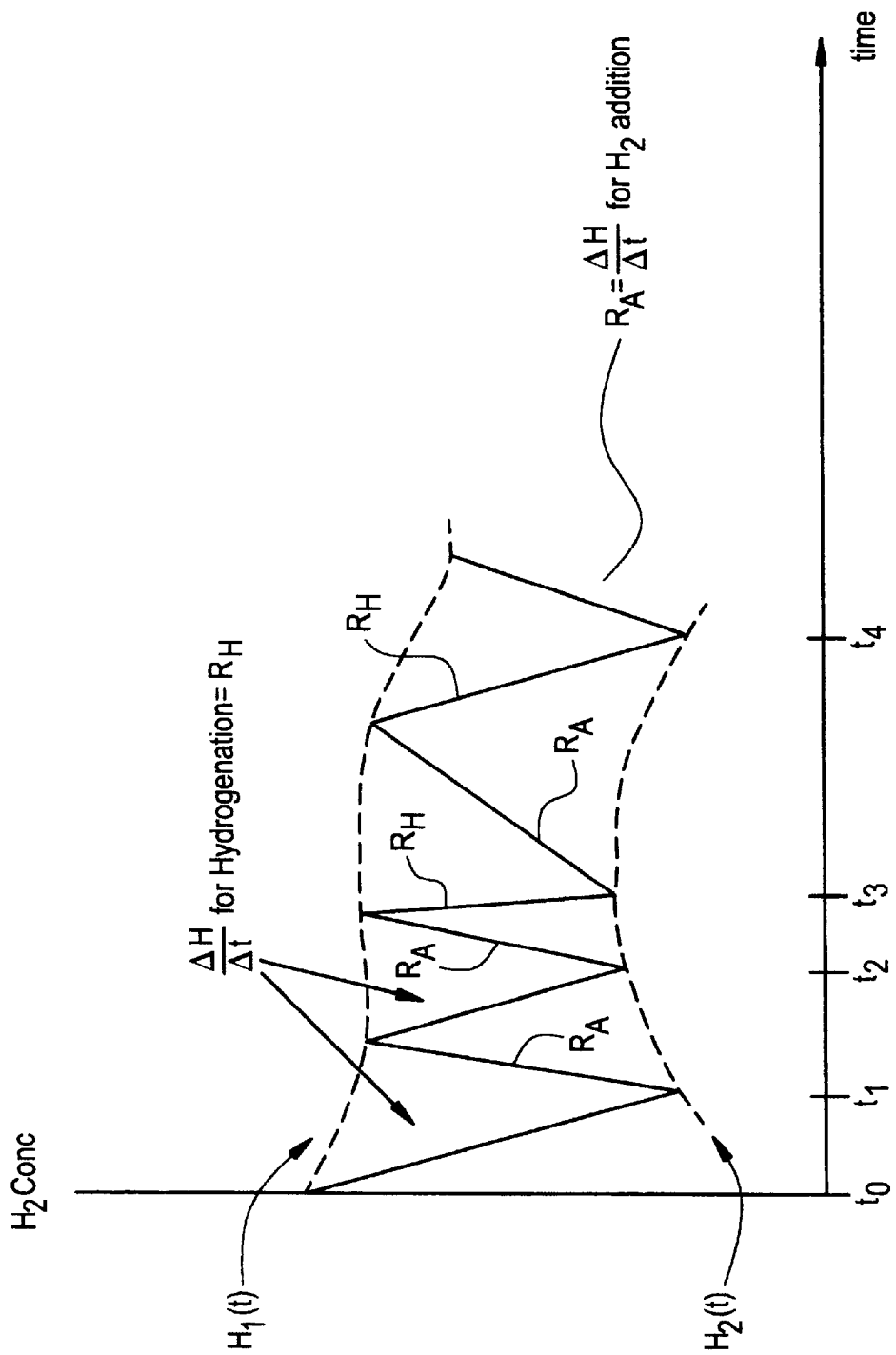
FIG. 3 is a graphical representation of the hydrogen concentration for another embodiment of a polymerization according to the present invention.

It must be understood that one or all of H1, H2, $R_A$ and $R_B$ may be made to vary as functions of time, to control the physical properties of the final produced polymer. For example, see FIG. 3 showing a graphical representation of the reactor concentration of hydrogen, with H1, H2, $R_A$ and $R_B$ varying as functions of time. It should also be understood that while FIG. 3 illustrates the various $R_A$ and $R_B$ functions as straight lines, any or all of them may be non-linear functions.

Generally, the amount of time to deplete the hydrogen concentration from concentration H1 to concentration H2 be will be in the range of about 0.1 minutes to about 3 hours. Preferably, the amount of time to deplete the hydrogen concentration from concentration Hi to concentration H2, will be in the range of about 0.5 minutes to about 1 hour, more preferably in the range of about 5 minutes to about 30 minutes, and most preferably in the range of about 10 minutes to about 20 minutes.

Generally, the amount of time to increase the hydrogen concentration from concentration H2 to concentration H1 be will be in the range of about 0.1 minutes to about 3 hours. Preferably, the amount of time to increase the hydrogen concentration from concentration H2 to concentration H1, will be in the range of about 0.1 minutes to about 30 minutes, more preferably in the range of about 0.1 minutes to about 10 minutes, and most preferably in the range of about 0.1 minutes to about 5 minutes.

While any suitable hydrogen concentration may be utilized for the concentration H1, it will generally be limited by the solubility level of hydrogen in propylene at reaction temperature and pressure. For example, while not wishing to be so limited, applicants believe for their particular reactor configuration and operating conditions, the maximum hydrogen concentration will be on the order of a few mol percent, that is about 3 or 4 mol percent, of the reaction mixture. Following an addition, subsequent additions are not made until the hydrogen concentration is at the desired concentration H2. While in some cases the desired concentration H2 will be substantially at or close to zero, in other cases it will be between H1 and zero, depending upon the molecular weight distribution desired.

It is noted that at lower hydrogen concentration levels in the reaction zone, lower melt flow polymers are produced as compared to higher hydrogen concentration levels at which higher melt flow polymers are produced. The level or concentration of hydrogen in the reaction zone is a function of the amount of hydrogen introduced to the zone, the amount of and activity of the hydrogenation catalyst present in the reaction zone, and elapsed time since the last addition of hydrogen.

While the process has been described above by reference to

The catalyst system utilized in the present invention must be bifunctional, that is, suitable to serve both as an olefin polymerization catalyst and as a hydrogenation catalyst. This may be accomplished by utilizing a catalyst which is both an olefin polymerization catalyst and a hydrogenation catalyst, or by using a catalyst system including both an olefin polymerization catalyst and a hydrogenation catalyst.

The hydrogenation catalyst will generally comprise any suitable portion of the catalyst system to produce a desired molecular weight distribution. Generally, the hydrogenation catalyst will comprises in the range of about 0.01 to about 20 weight percent of the catalyst system, preferably in the range of about 0.05 to about 10 weight percent, more preferably in the range of about 1 to about 7 weight percent, and most preferably in the range of about 2 to about 5 weight percent.

"Metallocene" catalysts and their method of making are well known in the art, and are generally understood to contain one or more cyclopentadienyl moiety in combination with a transition metal, with such a metallocene complex utilized in conjunction with an alumoxane cocatalyst or reaction product thereof.

The inventors have discovered that catalysts which function as both an olefin polymerization catalyst and a hydrogenation catalyst include metallocenes of the general formula $(Cp)_m TiX_n$, wherein Cp is a substituted or unsubstituted cyclopentadienyl ring, X is a halogen, m=1–2, n=2–3, and wherein m+n=4. The cyclopentadienyl ring may be unsubstituted or substituted with hydrogen or hydrocarbyl radicals. The hydrocarbyl radicals may include alkyl, alkenyl, aryl, alkylaryl, arylalkyl, and like radicals containing from about 1 to about 20 carbon atoms. Nonlimiting examples of hydrocarbyl radicals include methyl, ethyl, propyl, butyl, amyl, isoamyl, hexyl, isobutyl, heptyl, octyl, nonyl, decyl, cetyl, 2-ethylhexyl, phenyl and the like. Exemplary halogen substituents include chlorine, bromine, fluorine and iodine, with chlorine being preferred. Suitable nonlimiting examples of metallocenes include $Cp_2TiCl_2$ or $CpTiCl_3$.

The above metallocenes may also be utilized with conventional Ziegler-Natta catalysts or other metallocenes. For example, the inventors have also discovered that conventional Ziegler-Natta catalysts and other metallocene catalysts may be used with, blended with, or modified by metallocenes of the general formula $(Cp)_m TiX_n$, as explained above, to produce a catalyst system which is both an olefin catalyst and hydrogenation catalyst.

The conventional Ziegler-Natta type polymerization catalyst useful in the present invention is basically a complex derived from a halide of a transition metal, for. example, titanium, chromium or vanadium, with a metal hydride and/or a metal alkyl that is typically an organoaluminum compound. The catalyst component is usually comprised of a titanium halide supported on magnesium compound complexed with an alkylaluminum.

The Ziegler-Natta catalyst is generally utilized with an electron donor compound in the polymerization reaction to reduce the atactic form of the polymer thereby giving control of and increasing the production of isotactic polymers.

The co-catalyst for a conventional supported Ziegler-Natta catalyst is an organoaluminum compound.

To modify a conventional Ziegler-Natta catalyst with the above described metallocene of the general formula $(Cp)_m TiX_n$, the metallocene is added during the synthesis of the Ziegler-Natta catalyst. The process for so modifying a Ziegler-Natta catalyst is disclosed in pending U.S. application Ser. No. 08/474,883, filed Jun. 7, 1995 U.S. Pat. No. 5,767,031 by Shamshoum et al, for "Ziegler-Natta Catalysts With Metallocenes For Olefin Polymerization", herein incorporated by reference.

For example, as disclosed in U.S. application Ser. No. 08/474,883, a Ziegler-Natta type catalyst may be modified by adding a metallocene during the synthesis of the Ziegler-Natta catalyst, with such addition occurring either prior to a titanation step, or during heating following a titanation step.

It should also be understood that a Ziegler-Natta type catalyst may be modified by mixing or blending the Ziegler-Natta catalyst with a metallocene of the type described above.

Conventional Ziegler-Natta catalysts and metallocene catalysts may also be utilized with conventional hydrogenation catalysts. Examples of suitable conventional hydrogenation catalysts include Group VI or VIII metals on a metal oxide support or a non-polar support such as graphite or polymer. As non-limiting examples, Cr, Co, Mo, W, Ni, Pd or Pt, are metals suitable for use as hydrogenation catalysts.

While the present invention has been illustrated mainly by reference to polymerization of propylene, it is to be understood the inventors believe the present invention can be used for the polymerization of any type of α-olefins. For example, the present invention may be utilized for polymerizing ethylene, propylene, butylene, pentene, hexene, 4-methyl-1-pentene and other α-alkenes having at least 2 carbon atoms, and also for mixtures thereof. Preferably, the present invention is utilized for the polymerization of propylene to produce polypropylene, most preferably a broad molecular weight distribution polypropylene.

By practice of the present invention, polypropylene having a broad molecular weight distribution generally greater than about 8.5 may be produced in a single reactor. Preferably, polypropylene having a broad molecular weight distribution greater than about 9, more preferably greater than about 10, even more preferably greater than about 11, and still more preferably greater than about 12 may be produced in a single reactor with a single catalyst system.

EXAMPLES

The following examples are provided merely to illustrate the invention, and are not intended to limit the scope of the claims in any way.

Example 1

In this Example, laboratory batch polymerizations were carried out to demonstrate single reactor hydrogen staging.

The catalyst utilized was prepared as mixtures of a conventional Ziegler-Natta catalyst THC (see U.S. Pat. Nos. 4,816,433 and 4,839,321, both herein incorporated by reference), and 1 to 4 wt % finely ground $Cp_2TiCl_2$ in a mineral oil slurry of 100 mg catalyst/10 mL mineral oil.

Polymerization was carried out using the general conditions summarized below in Table 1. The yield, melt flow rate values (MF, in grams/10 minutes), and percent xylene solubles (%XS) were determined for the polymer fluff from each run. The samples were also characterized for molecular weights and polydispersity ($M_w/M_n$) by gel permeation chromatography (GPC). Selected samples were characterized by die swell.

TABLE 1

Bulk Homopolymerization Conditions

| conditions | |
|---|---|
| catalyst | 10 mgrams |
| cocatalyst | 1.0 mmoles TEAL |
| donor | 0.02 mmoles CMDS |
| Al/Ti ratio | 200 (THC only, neglecting $Cp_2TiCl_2$) |
| Al/Si ratio | 50 |
| reactor | 2 L Zipperclave |
| propylene | 1.4 L (ca. 720 g) |
| hydrogen | added from ca. 48 cc pressure vessel |
| temperature | 70° C. |
| time | 1 hour total |
| catalyst precontact | standard, one vessel |
| prepolymerization | in situ, starting at room temperature |

Polymerizations were performed as follows. For all of the runs, hydrogen was added to the reactor prior to the polymerization. However, for runs 2–10 additions were made during the polymerization to mimic hydrogen stages. For these staged polymerizations, the amount of hydrogen used in each addition remained constant (300 Δpsig; ca 0.24 mole % relative to initial propylene), but the time between the additions (i.e., the cycle time) was varied from 10 to 20 minutes.

Polymerization results are summarized in the following Table 2.

For Table 2, runs No. 1 and 2 were performed using unmodified THC catalyst with run No. 1 employing a single hydrogen addition prior to the polymerization, and run No. 2 employing "staged" hydrogen added evey 15 minutes (i.e., for 4 stages or cycles in the 1 hour run). Without the hydrogenation catalyst, hydrogen accumulated in the reactor to produce higher melt flows with each stage. However, when metallocene was added for run Nos. 3–10, hydrogen staging plus hydrogenation caused the hydrogen level to decrease somewhat following each addition (the final high melt flow shows that the hydrogen was not completely consumed following each addition). This cycling is consistent with and evident by an increase in polydispersity as measured by increases in D ($M_w/M_n$), D' ($M_z/M_w$), and die swell.

Example 2

The procedures of Example 1 were utilized with the exception that a Ziegler-Natta catalyst Lynx 1000 (see U.S. Pat. Nos. 4,784,983 and 4,861,847, both herein incorporated by reference) was substituted for catalyst THC. Results are given in the following Table 3.

TABLE 2

Staged Polymerization Results.

| Run | % Cp2TiCl2 | Cycle Time (minutes) | Yield (g) | Melt Flow (g/10 min) | Bulk Density of Fluff (g/cc) | % XS | D ($M_W/M_N$) | D' ($M_Z/M_W$) | Die Swell |
|---|---|---|---|---|---|---|---|---|---|
| 1 | NONE | NONE[A] | 411 | 7.5 | 0.46 | 2.1 | 7.3 | 3.7 | 3.14 |
| 2 | NONE | 15 | 520 | 20.4 | 0.48 | 2.1 | 7.3 | 4.0 | 3.54 |
| 3 | 1 | 10 | 475 | 24.2 | 0.48 | 2.7 | 8.7 | 5.2 | 4.92 |
| 4 | 1 | 15 | 462 | 10.2 | 0.48 | 2.4 | 8.7 | 4.7 | 3.96 |
| 5 | 1 | 20 | 471 | 4.7 | 0.46 | 2.6 | 9.4 | 4.6 | 4.32 |
| 6 | 2 | 10 | 334 | 5.2 | | 2.5 | 10.1 | 4.2 | |
| 7 | 3 | 10 | 398 | 8.2 | 0.47 | 1.3 | 9.9 | 5.0 | |
| 8 | 3 | 15 | 286 | 0.9 | 0.46 | 2.0 | 10.7 | 3.8 | 4.02 |
| 9 | 3 | 20 | 231 | 0.3 | 0.42 | 3.0 | 10.1 | 3.8 | |
| 10 | 4 | 10 | 266 | 0.8 | 0.42 | 2.6 | 13.0 | 4.6 | 4.22 |

[A]Indicates single hydrogen addition at the start of the run.

TABLE 3

Staged Polymerization Results.

| Run | % Cp2TiCl2 | Cycle Time (minutes) | Yield (g) | Melt Flow (g/10 min) | Bulk Density of Fluff (g/cc) | D ($M_W/M_N$) | D' ($M_Z/M_W$) |
|---|---|---|---|---|---|---|---|
| 11 | NONE | NONE[A] | 329 | 17.3 | 0.39 | 6.0 | 3.5 |
| 12 | NONE | 15 | 239 | 54.0 | 0.37 | 5.5 | 3.1 |
| 13 | 1 | 10 | 270 | 7.1 | 0.39 | 7.5 | 3.6 |
| 14 | 1 | 15 | 316 | 8.4 | 0.40 | 7.9 | 4.6 |
| 15 | 1 | 20 | 267 | 9.0 | 0.37 | 8.4 | 4.9 |
| 16 | 3 | 10 | 225 | 2.2 | 0.37 | 9.7 | 4.7 |
| 17 | 3 | 15 | 166 | 0.6 | 0.38 | 9.4 | 3.7 |
| 18 | 3 | 20 | 169 | 0.5 | 0.38 | 7.1 | 3.4 |

Example 3

Preparation of BMWD Catalyst

A broad molecular weight distribution (BMWD) catalyst modified with $Cp_2TiCl_2$ was prepared by addition of the $Cp_2TiCl_2$ added prior to the second titanation.

All manipulations were carried out under an inert atmosphere using conventional Schlenk and drybox techniques. The toluene and heptane solvents were freshly distilled under an inert atmosphere using (molten) metallic sodium as a drying agent.

$Cp_2TiCl_2$ (97%) was used as received from Aldrich. Di-n-butylphthalate (DBP, Aldrich, 99+%) was vacuum-distilled after pre-drying over anhydrous potassium carbonate. Samples of magnesium ethylate ($Mg(OEt)_2$, Huls) were obtained and dried overnight in vacuo at 120° C.

General Catalyst Preparation. As used herein, the Ti/ligand (Ti/L) or Ti/modifier ratio is defined as the ratio of mmoles $TiCl_4$ used in one titanation (here, 364 mmoles) to mmoles of ligand (i.e., Cp) added with the modifier.

A 3-neck (straight-necked) 500 mL round bottom flask containing a magnetic stirring bar was charged at room temperature with 10 grams of magnesium ethylate (Mg(OEt) 2; FW 144.44, 87.4 mmoles) and ca. 80 mL of freshly distilled toluene to yield a slurry. While stirring, the $Mg(OEt)_2$/toluene mixture is heated to 90° C. on an oil bath.

First Titanation: The $Mg(OEt)_2$/toluene mixture was heated to 90° C. while stirring. While stirring the mixture at 90° C., 20 mL of titanium tetrachloride ($TiCl_4$; FW 189.71, d 1.730, 364 mmoles) was added dropwise over a fifteen minute period. After 15 of the 20 mL of $TiCl_4$ had been added, 2.7 mL of di-n-butylphthalate (DBP; FW 278.35, d 1.043, 10.1 mmoles) was added via syringe. After the $TiCl_4$ addition was complete, the mixture was heated to 115° C. and held at that temperature for 2 hours.

After the heating, the mixture was cooled to 90° C. and stirring was stopped to allow the mixture to settle. The temperature was maintained at 90° C. and the supernatant reaction mixture was decanted. The solid was then washed twice with ca. 200 mL of toluene at 90° C.

Second Titantion. While still maintaining the temperature at 90° C., the solid was again slurried in ca. 80 mL of toluene. The modifying reagent was added to the mixture at 90° C. and then stirred for 15 minutes (if no modifier was added this 15 minute stirring was omitted). A second 20 mL portion of $TiCl_4$ was then added dropwise over a fifteen minute period. After the $TiCl_4$ addition was complete, the mixture was again heated to 115° C. and held at that temperature for 2 hours.

Washings. After the second heating, the mixture was cooled to 90° C. and stirring was stopped to allow the mixture to settle. The temperature was maintained at 90° C. and the supernatant reaction mixture was decanted. The temperature was then lowered to 40° C. and the solid washed five times with ca. 150 mL of heptane at 40° C. The solid was then dried in vacuo with some heating (35–40° C.) to yield the dry catalyst powder.

Example 4

Polymerization Using BMWD Catalyst

The catalysts prepared in Example 3 were utilized in polymerization of propylene using the general conditions as discussed in Example 1 above, with results shown in Table 4 below.

TABLE 4

Staged Polymerization ResuLts -BMWD Catalyst.

| Run | % Cp2TiCl2 | Cycle Time (minutes) | Yield (g) | Melt Flow | % XS | D ($M_W/M_N$) | D' ($M_Z/M_W$) |
|---|---|---|---|---|---|---|---|
| 19 | BMWD | 15 | 434 | 19.7 | 5.9 | 7.7 | 4.3 |
| 20 | BMWD | 20 | 343 | 24.4 | 4.8 | 8.6 | 4.3 |

As shown in Example 1, Table 1, a 1% level of metallocene requires 20 minutes or longer cycle times to observe strong consumption of hydrogen following each addition. However, consumption can easily be increased by raising the metallocene level. In comparison, this Example 3 shows that melt flow and GPC results for hydrogen-staged runs using the BMWD catalyst are consistent with a much lower metallocene loading than 1%.

The level of metallocene is critical in striking the proper balance between high and low melt flow polymer production on the desired timescale. Using too much hydrogenation catalyst produces only low or "zero" melt flow polymer. Using too little produces only a high melt flow polymer. In the first extreme, hydrogen could be consumed nearly as fast as it is added in the addition stage; therefore, a high hydrogen level is not attained to produce a high melt flow polymer. In the latter case, the rate of hydrogenation would be insufficient to substantially decrease hydrogen levels and produce a low melt fow polymer. In either case, "staging" has not occurred.

Example 5

In this Example, THC catalyst was mixed with various amounts of $Cp_2TiCl_2$, ranging from 0 to 1.0 wt %. Polymerizations with each of the catalysts were carried out essentially as described above, except that a hydrogen level of 330 Δpsig (ca. 0.27 mole %) was used and the hydrogen was not staged. Results are shown in the following Table 5.

TABLE 5

Polymerization At Various Modifier Levels.

| Run | Cp2TiCl2 (%) | Yield (g) | Melt Flow | % XS | D ($M_W/M_N$) | D' ($M_Z/M_W$) |
|---|---|---|---|---|---|---|
| 21 | 0 | 444 | 10.7 | 1.63 | 7.7 | 3.6 |
| 22 | 0.1 | 348 | 10.2 | 2.43 | 8.7 | 4.0 |
| 23 | 0.1 | 422 | 8.7 | 2.64 | 6.8 | 3.5 |
| 24 | 0.3 | 271 | 4.1 | 2.52 | 7.9 | 3.6 |
| 25 | 0.4 | 255 | 0.9 | 5.54 | 8.7 | 3.7 |
| 26 | 0.5 | 169 | 0.4 | 3.03 | 9.3 | 3.4 |
| 27 | 0.5 | 197 | 0.4 | 2.84 | 10.5 | 3.8 |

TABLE 5-continued

Polymerization At Various Modifier Levels.

| Run | Yield (g) | Melt Flow | % XS | D ($M_W/M_N$) | D' ($M_2/M_W$) |
|---|---|---|---|---|---|
| 28 | 0.5 | 163 | 0.12 | 2.18 | N/A[A] |
| 29 | 0.7 | 210 | 0.6 | 2.51 | 10.2 | 3.7 |
| 30 | 0.7 | 158 | 0.15 | 2.82 | N/A[A] |
| 31 | 1.0 | 163 | 0.2 | 4.00 | N/A[A] |
| 32 | 1.0 BMWD | 162 | 0.2 | 2.63 | N/A[A] |
| 33 | BMWD | 217 | 0.9 | 2.72 | 9.4 | 3.6 |
| 34 | BMWD | 198 | 0.6 | 2.17 | 9.0 | 3.7 |

[A]The lowest melt flow samples were not analyzed by GPC to avoid a gelling problem.

Figure 1:
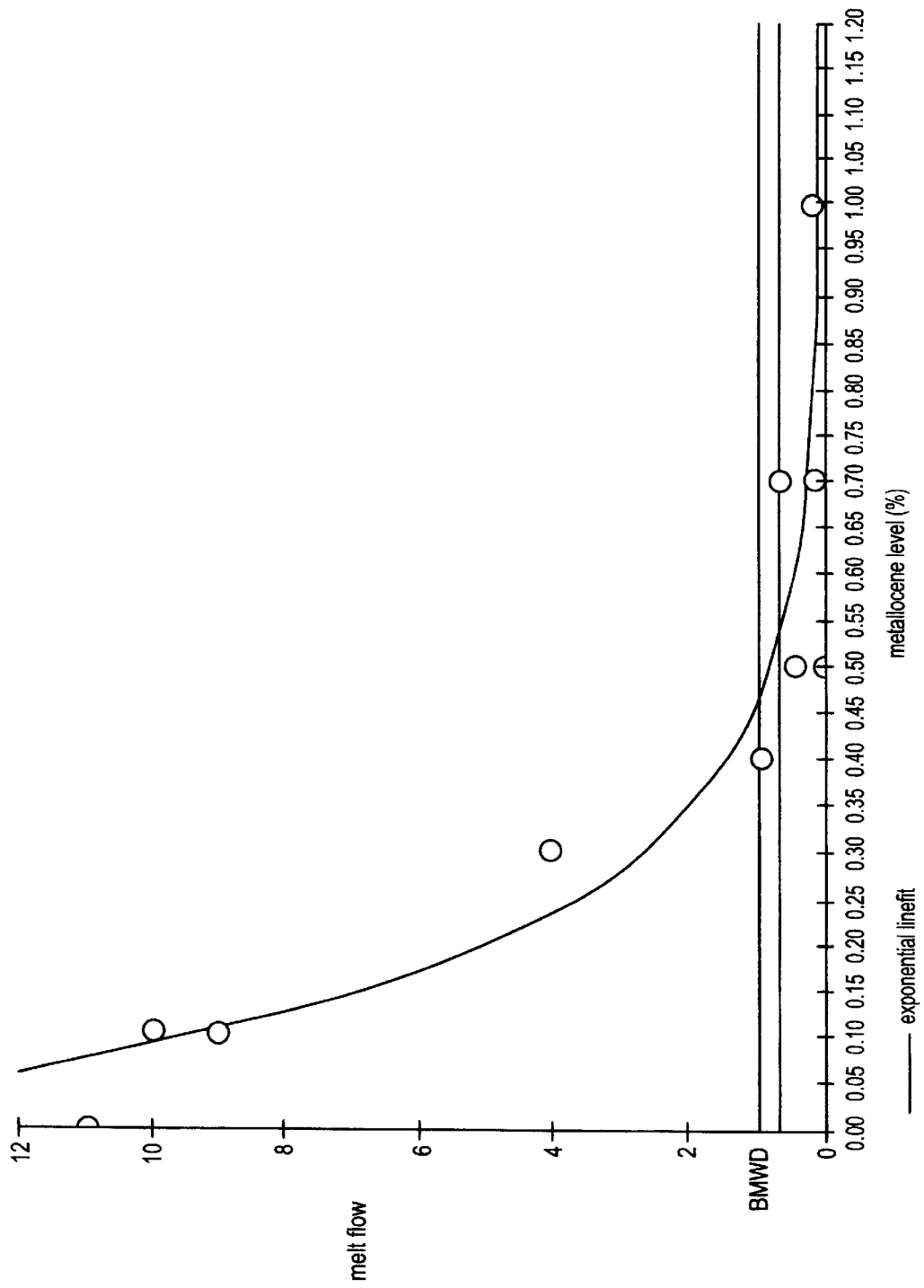
FIG. 1 is a graphical representation of the data in Table 5 of Example 5.

The data in Table 5 are also shown graphically in FIG. 1. An exponential linefit is shown only for purposes of highlighting the apparent melt flow trend, and the two horizontal lines represent the melt flow results for the BMWD catalyst (i.e., 0.9 and 0.6 g/10 min). Despite some scatter in the data, the melt flow clearly drops as the level of the $Cp_2TiCl_2$ increases. This is consistent with increasing rates of hydrogeneation and increases in the production of low melt flow polymer during the test.

Under these conditions, the melt flow drops rapidly until a level of about 0.4 wt % $Cp_2TiCl_2$ and then the trend plateaus. By comparison, the BMWD catalyst yields a melt flow which is consistent with roughly a 0.4 to 0.5 wt % $Cp_2TiCl_2$.

Example 6

Testing of Various Catalysts

In this Example, laboratory batch bulk polymerization was carried out using the procedures of Example 1 to investigate the hydrogenation phenonemon using different polymerizatin catalysts and different cyclopentadienyl titanium, zirconium or hafnium compounds. The reactor headspace was sampled at 10, 20 and 60 minutes after the start of each test and analyzed by head space gas chromatography (GC) for propane and hydrogen. The propane analyses proved the most reliable and the results are shown below in Table 6. The hydrogen analyses are shown to highlight only those cases where complete consumption was observed by the total disappearance of the hydrogen peak in the GC trace. The initial propane level in the headspace is approximately 0.34 mole %. The calculated propane level after hydrogenation, assuming all H2 is consumed to form propane, is approximately 0.54 mole %, The catalysts tested were as follows.

THC-A-021—standard commercially available Ziegler-Natta catalyst system from Toho Titanium.
"Modified"—catalyst of Example 3.
"Blend"—dry blend of the THC-A-021 with 1 wt % $Cp_2TiCl_2$.
$Cp_2TiCl_2$—titanocene dichloride.
$CpTiCl_3$—cyclopentadienyl titanium trichloride.
$Cp_2ZrCl_2$—zirconocene dichloride.
$Cp_2HfCl_2$—hafnocene dichloride.
"Supported"—2 wt % $Cp_2TiCl_2$ supported on MAO/$SiO_2$.

The catalyst systems utilized were as follows.

THC-A-021, Modified, or Blend catalysts

| | |
|---|---|
| Catalyst: | 10 mgrams |
| Cocatalyst: | 1.0 mmols TEAL |
| Donor: | 0.02 mmols CMDS |

$Cp_2TiCl_2$, $CpTiCl_3$, $Cp_2ZrCl_2$ or $Cp_2HfCl_2$ catalysts

| | |
|---|---|
| Catalyst: | 10 mgrams |
| Cocatalyst: | 1.0 mmols TEAL or 4.0 mL 30 wt % MAO in Toluene |
| Donor: | None |

Supported $Cp_2TiCl_2$

| | |
|---|---|
| Catalyst: | 10 mgrams |
| Cocatalyst: | 4.0 mL 30 wt % MAO in Toluene |
| Donor: | None |

Polymerization results are presented in Table 6 below.

TABLE 6

| | 10 min (mol %) | 20 min (mol %) | 60 min (mol %) |
|---|---|---|---|
| THC-A-021/TEAL | | | |
| Propane | 0.29 | 0.28 | 0.23 |
| Modified/TEAL | | | |
| Propane | 0.49 | 0.53 | 0.56 |
| Hydrogen | 0.61 | 0.27 | 0 |
| Blend/TEAL | | | |
| Propane | 0.58 | 0.58 | |
| Hydrogen | 0.05 | 0 | |
| $Cp_2TiCl_2$/TEAL | | | |
| Propane | 0.58 | 0.58 | 0.58 |
| $CpTiCl_2$TEAL | | | |
| Propane | 0.35 | 0.38 | 0.43 |
| Hydrogen | 0.74 | 0.75 | 0.15 |
| $Cp_2ZrCl_2$/TEAL | | | |
| Propane | 0.32 | 0.32 | 0.32 |
| $Cp_2ZrCl_2$/TEAL | | | |
| Propane | 0.31 | 0.32 | 0.32 |
| $CpTiC3_2$/MAO | | | |
| Propane | 0.51 | 0.52 | 0.52 |
| Supported/MAO | | | |
| Propane | 0.37 | 0.42 | 0.52 |
| Hydrogen | 0.26 | 0.12 | 0 |

This Example shows that $Cp_2TiCl_2$ and the catalysts incorporating $Cp_2TiCl_2$ all exhibit complete hydrogen consumption with corresponding increases in propane levels under these conditions (that is, typical batch polymerization conditions). Complete consumption occured using a range of 1 mgram of $Cp_2TiCl_2$, alone with TEAL or MAO) to 0.1 mgrams (in the 1 wt % blend with THC-A-021). Hydrogenation occurred using either TEAL or MAO cocatalyst. $CpTiCl_3$ also shows evidence for hydrogenation, but under these conditions $Cp_2TiCl_2$ is clearly more active. Under these conditions, neither the zirconocene, the hafnocene, or the unmodified Ziegler-Natta catalyst are consistent with any significant hydrogenation under these conditions.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

We claim:

1. A process for hydrogenating an unsaturated hydrocarbon comprising:

(a) introducing an unsaturated hydrocarbon into a reaction zone for a reaction residence time, wherein a catalyst system is present in the reaction zone the catalyst system comprising a metallocene of the general formula $(Cp)_m TiX_n$, wherein Cp is a substituted or un-substituted cyclopentadienyl ring, X is a halogen, m=1–2, n=2–3, and wherein m+n =4;

(b) introducing hydrogen at an addition rate to the reaction zone during the introducing of step (a), wherein the hydrogen is introduced to achieve a first hydrogen concentration, with the introduction subsequently stopped to allow the hydrogen to deplete at a depletion rate to a second hydrogen concentration; and (c) repeating step (b) prior to expiration of the reaction residence time.

2. The process of claim 1 wherein in step (c), step (b) is repeated at least two times.

3. The process of claim 1 wherein the first hydrogen concentration, second hydrogen concentration, and addition rate are substantially constant.

4. The process of claim 1 wherein one or more of the first hydrogen concentration, second hydrogen concentration, addition rate and depletion rate vary with respect to time.

5. A process for hydrogenating an unsaturated hydrocarbon comprising:

(a) introducing an unsaturated hydrocarbon into a reaction zone for a reaction residence time, wherein a catalyst system is present in the reaction zone;

(b) introducing hydrogen at an addition rate to the reaction zone during the introducing of step (a), wherein the hydrogen is introduced to achieve a first hydrogen concentration, with the introduction subsequently stopped to allow the hydrogen to deplete at a depletion rate to a second hydrogen concentration; and (c) repeating step (b) prior to expiration of the reaction residence time.

6. The process of claim 5 wherein in step (c), step (b) is repeated at least two times.

7. The process of claim 5 wherein the first hydrogen concentration, second hydrogen concentration, and addition rate are substantially constant.

8. The process of claim 5 wherein one or more of the first hydrogen concentration, second hydrogen concentration, addition rate and depletion rate vary with respect to time.

9. The process of claim 5 wherein the catalyst system comprises an olefin polymerization catalyst and a hydrogenation catalyst.

10. The process of claim 5 wherein the catalyst system comprises a metallocene of the general formula $(Cp)_m TiX_n$, wherein Cp is a substituted or un-substituted cyclopentadienyl ring, X is a halogen, m=1–2, n=2–3, and wherein m+n=4.

11. The process of claim 5 wherein the catalyst system comprises a Ziegler-Natta catalyst and a metallocene of the general formula $(Cp)_m TiX_n$, wherein Cp is a substituted or un-substituted cyclopentadienyl ring, X is a halogen, m=1–2, n=2–3, and wherein m+n=4.

12. The process of claim 5 wherein the catalyst system comprises a Ziegler-Natta catalyst modified with a metallocene of the general formula $(Cp)_m TiX_n$, wherein Cp is a substituted or un-substituted cyclopentadienyl ring, X is a halogen, m=1–2, n=2–3, and wherein m+n=4.

* * * * *